Aug. 24, 1954
H. M. GULICK ET AL
2,687,449
BATTERY CAP APPARATUS
Filed Aug. 17, 1953
FIG.1
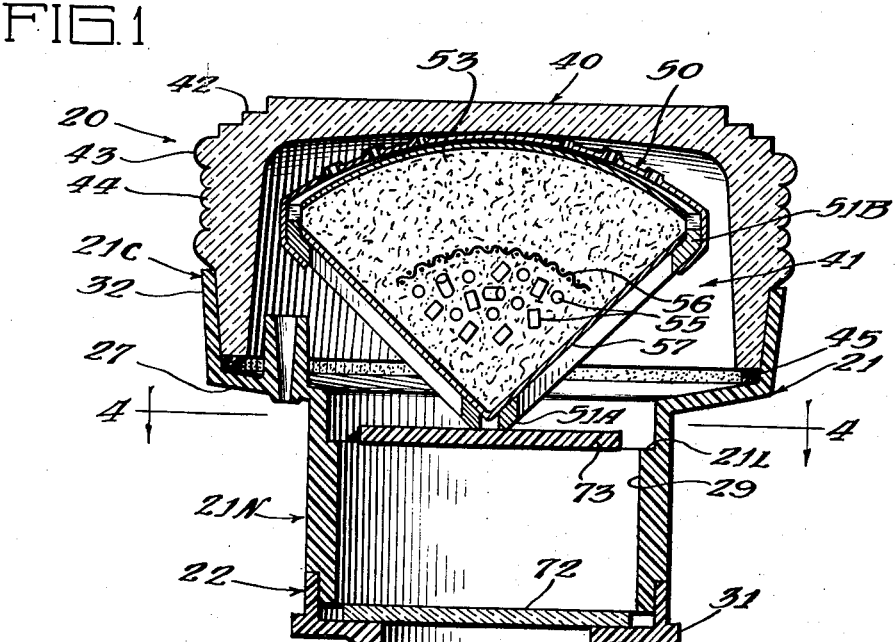
FIG.2
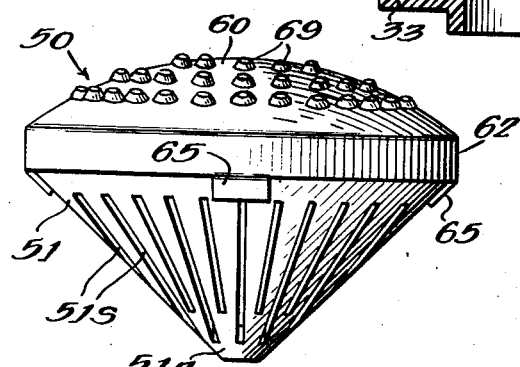
FIG.3
FIG.4
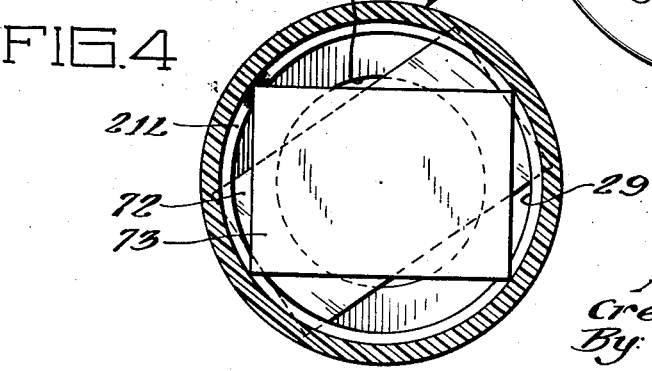
Inventors:
Harold M. Gulick
Cresswell E. Stedman
By: Wallace and Cannru
Attorneys Patented Aug. 24, 1954

2,687,449

UNITED STATES PATENT OFFICE 2,687,449

BATTERY CAP APPARATUS

Harold M. Gulick, Miami, and Cresswell E. Stedman, Coral Gables, Fla., assignors to Industrial Research, Inc., Miami, Fla., a corporation of Florida Application August 17, 1953, Serial No. 374,552

8 Claims. (Cl. 136—179)

This invention relates to a catalytic reactor unit adapted to be used with an electrolytic cell, and in particular the invention relates to the type of catalytic reactor unit described in our copending application Serial No. 334,814, filed February 3, 1953.

In our above identified copending application there is described a catalytic battery unit that is adapted to be used in connection with the batteries of automotive vehicles, or like electrolytic cells, so that the depleted supply of water in the battery cell, depleted through the evolution of hydrogen and oxygen during use of the battery, may be continuously renewed by recombining, catalytically, the hydrogen and oxygen gases thus evolved. In the catalytic reactor unit thus described, a catalyst unit is mounted and arranged within a cap-like housing that is adapted to be removably attached to the battery cell as desired, and several different forms of such catalyst units are set forth in the above identified application. The present invention is concerned primarily with an improved catalyst unit that is adapted to be arranged in a catalytic reactor unit of the aforesaid type, and one of the objects of the present invention is to so construct and arrange a catalyst unit of the foregoing type that the catalytically recombined water emitting from the catalyst unit will be in the form of water vapor or steam which cannot return back to the catalyst unit as liquid water. A further object of the present invention is to expedite the transfer of heat away from the interior of this catalyst unit by convection currents, such heat being represented by the heats of reaction inherently generated during the formation of water from the constituent gases hydrogen and oxygen.

A further object of the present invention is to obtain a minimum amount of direct contact between the catalyst unit and the glass cap in which it is mounted so that the catalyst unit is at such temperature as to assure that all water re-combined thereby is in vapor form and at such temperature as to provide for maximum catalyst efficiency. An additional object of the present invention is to permit the foregoing to be obtained by a relatively simple and inexpensive catalyst unit.

Other objects of the present invention are to utilize a porous cone-shaped holder for the catalyst so that a maximum degree of efficiency is attained in directing the reactant gases onto the catalyst; to cover this holder unit into a rounded and porous metal cap that will account for rapid dissipation of the heat generated within the holder during catalysis; to so form the cap that condensed water will not collect thereon; and to relate the holder to the remainder of the catalyst unit in such a manner that a turbulence and thorough mixing of gases is attained within the reactor chamber of the catalyst unit with the opportunity for recirculation of any unreacted gases, thereby raising the over-all efficiency of the apparatus.

Other and further objects of the present invention will be apparent from the following description and claims and are illustrated in the accompanying drawings which, by way of illustration, show a preferred embodiment of the present invention and the principle thereof and what we now consider to be the best mode in which we have contemplated applying that principle. Other embodiments of the invention embodying the same or equivalent principle may be used and structural changes may be made as desired by those skilled in the art without departing from the present invention.

In the drawings:

Fig. 1 is a sectional view taken through a catalytic reactor unit embodying a catalyst unit of the present invention;

Fig. 2 is an elevation of a catalyst unit constructed along the lines of the present invention;

Fig. 3 is a top plan view on Fig. 2; and

Fig. 4 is a sectional view taken on the line 4—4 of Fig. 1.

For purposes of disclosure, the present invention as illustrated in Figs. 1 to 4 is embodied in a catalytic reactor unit 20 of the general type set forth and described in our above identified copending application. Thus, the catalytic reactor unit 20 resembles a cap in appearance, embodying a rounded hollow glass closure member 40 to the open end of which is connected a rounded housing 21 having a hollow stem or neck 21N. As shown in Fig. 1, the stem 21N is of reduced diameter relative to the upper portion of the housing 21, and the lower end of the stem 21N is grooved to permit an annular vertical extension of a hollow socket member 22 to be adhesively attached thereto. The socket 22 has a threaded outer wall 25 disposed between a flat upper wall 31 and a flat lower wall 33 of reduced diameter. The housing 21 and the socket 22 are preferably made of a corrosive resistant thermosetting plastic.

The threaded wall 25 on the attaching socket 22 is of a size to conform to the threaded opening at the top of a conventional battery for automotive vehicles, and hence it will be seen that in this manner the reactor unit 20 may be conveniently connected to and assembled on such a battery, taking the place of the usual small closure cap that is afforded for the battery to permit the plates of the battery to be inspected with regard to the acid solution level. While the reactor 20 thus described is adapted for use with an automobile battery, it will be appreciated that the same may be utilized to equal advantage with other types of electrolytic cells, and therefore the invention is not limited in this regard.

As shown in Fig. 1, the socket 22 also includes an integral nipple or relatively short conduit 26 which is attached to the lower end wall 33 thereof. This nipple 26 is adapted to establish communication between the interior of the reactor unit 20 and the electrolytic cell and under such circumstances the wall 31 serves to seal off the marginal edges around the opening in the cell in which the threaded side 25 of the socket 22 is mounted.

Thus, it will be seen from Fig. 1 that the arrangement of the parts described thus far is such that the interior of the hollow glass cap 40 affords a reactor chamber 41 in which, as will be pointed out below, the catalyzed reaction between hydrogen and oxygen is to take place. To this end, the top of the housing 21 includes a vertical outwardly flared wall 32 that is adapted to fit tightly against the outer sides of the glass cap 40, this relation being maintained by a sealing adhesive 45. By this arrangement, the vertical wall 32 serves to define a cup or bowl 21C at the top of the housing 21 somewhat complementary in shape to the glass cap 40.

The cup 21C is partially closed at the bottom by a downwardly and inwardly flared bottom wall 27 which terminates at the upper end of the neck 21N so that the interior of the neck 21N defines a relatively wide vertical passageway 29 leading toward the nipple 26. As shown in Fig. 1, the top wall 31 of the socket 22 extends part way across the passageway 29, so as to define another vertical passageway 30 which is adapted to render the passageway 29 and opening 26 communicable. From this it will be seen that a continuous passageway is afforded from the lower opening or nipple 26 up into the reactor chamber 41, and in this manner hydrogen and oxygen gases evolved from the electrolytic cell will rise upwardly and through the reactor unit 20 into the aforesaid reactor chamber. It might also be pointed out herein that in order to prevent liquid sprays, acid droplets, and the like from reaching or splashing up into the reactor chamber 41 with consequent contamination of the catalyst, a pair of rectangular baffles 72 and 73 are afforded in the vertical passageway in the reactor unit 20. The lower baffle, 72, is preferably of glass and is arranged on the wall 31 so as to divide the passageways 29 and 30 and is adhesively attached thereto. The upper baffle, 73, is in the form of a corrosive resistant hard rubber plate which is adhesively attached to a ledge 21L formed in the upper end of the passageway 29. Since the passageways 29 and 30 are round, and the baffles 72 and 73 rectangular, the reactant gases entering the reactor 20 have access to the chamber 41 as shown in Fig. 4.

Under and in accordance with the present invention, a catalyst unit 50 is arranged within the reactor chamber 41 so as to be supported between the glass cap 40 and the baffle 73, and the catalyst unit 50, it will be seen, is thus mounted in position to intercept hydrogen and oxygen gases rising upwardly through the vertical passageway in the reactor 20 into the chamber. In the present instance, the catalyst unit 50 embodies a holder in the form of a ceramic cone 51 which is of a highly porous nature in that it is formed with a plurality of radiating slots 51S arranged in a regular manner around the sloping vertical wall thereof. It will be appreciated, of course, that the particular manner in which the cone 51 is made porous is not important so long as openings of one kind or another are adapted to permit hydrogen and oxygen gases to pass from the reactor chamber 41 into the interior of the cone-shaped catalyst holder 51.

As can be seen in Fig. 1, the catalyst holder 51 is arranged in an inverted relation within the reactor chamber 41, that is, the apex end 51A is rested on the plastic baffle 73 and faces in the direction of the passageway which interconnects the reactor chamber 41 and the electrolytic cell. This relation of course disposes the base or opposite end, 51B, of the cone, upwardly so as to be disposed opposite the underside of the glass cap 40. The base end of the cone is open, and as will be pointed out in more detail below the relation between the holder 51 and cap 40 is such as to permit a particular type of heat transfer between the catalyst unit 50 and the exterior of the reactor unit 20.

The hollow interior of the cone 51 affords a receptacle for a mass of highly compacted and finely divided heat insulating material, such as shredded asbestos, and this mass of insulating material 53 constitutes a carrier for the catalyst material, the catalyst material being, of course, of the type that is adapted to catalyze the water-forming reaction between hydrogen and oxygen. Thus, the catalyst material in the present instance is in the form of a plurality of relatively small platinum-palladium pellets 55 which are arranged in a group within the carrier 53 in an insulated relation. As is pointed out in detail in our aforementioned copending application, the insulating material 53 is so treated and handled in preparation as to be of a water repellent or water resistant nature, and the finely divided condition of the insulating material 53 assures a metering action of the reactant gases on to the catalyst surface so that the development of "hot spots" and consequent explosive tendencies at the catalyst surface are eliminated.

It will be realized from the foregoing that the slots 51S in the holder 51 permit the passage of hydrogen and oxygen gases to and through the carrier 53 to the catalyst 55. In this manner, catalysis can be effected on the reactant gases hydrogen and oxygen. The water-forming reaction between hydrogen and oxygen is highly exothermic, and it is for this reason that every precaution must be taken to insure that excessive quantities of heats of reaction do not develop at local spots inside the reactor chamber 41 and are rapidly conducted away from the catalyst, considering the presence of hydrogen gas. One way to assure this would be by maintaining the catalyst pellets 55 in an insulated relation one with respect to the other within the body of the insulating material 53 so that no one pellet touches another. Also, in this connection, the finely divided nature of the insulation 53 would serve to assure that no one catalyst pellet would be over-supplied with hydrogen and oxygen, thus preventing over-heating in and around localized catalyst areas. In order that there may be further established a uniform distribution of the heats of reaction within the insulating catalyst carrier 53, a metallic heat conductor 56 is arranged over and above the group of catalyst pellets 55. This conductor 56 is preferably in the form of a sheet-like piece of corrosive resistant metal screen such as nickel, Monel metal or the like; and as can be seen in Figs. 1 and 2 a metal conductor cap 60 also of Monel metal or the like is stretched across the base of the holder 51 from one side to the other. The cap 60 includes a set of integral attaching tabs as 65 which are adapted to be bent back at an angle corresponding to the slope of the sides of the holder 51, and in this manner the cap 60 may be readily secured to the catalyst unit. In this connection, it might be pointed out that the cap 60 may be of a thinness such that it may be easily assembled from a leaf or foil of metallic conductor material of the foregoing kind, the sides 62 of the cap simply being crimped under such circumstances to conform to the diameter of the base 51B of the cone shaped holder 51.

As shown in the drawings, the top of the cap 60 is appreciably arcuate or rounded in configuration in that it slopes upwardly from the side wall 62 thereof toward the underside of the glass cap 40. The center of the cap 60 is engaged only slightly at the underside of the cap 40 just sufficiently, as best shown in Figs. 1 and 2, to hold the catalyst unit 50 in place within the reactor chamber 41 with the apex end 51A thereof engaging the top side of the baffle 73 which possesses some degree of resiliency so that the catalyst unit 50 may be held firmly between the cap 40 and this baffle. This particular consttruction, as will be pointed out below, permits the establishment of a particular type of heat transfer relation between the catalyst unit 50 and the glass cap 40, and also serves to provide a watershed for the liquid water that results from the water-forming reaction between hydrogen and oxygen within the interior of the catalyst holder 51.

Thus, under and in accordance with the present invention a means is afforded to permit the heats of reaction within the catalyst holder 51 to be transferred rapidly by convection, instead of conduction, to the glass cap 40, and in this connection it will be noted that the outer surface of the glass cap is provided with annular rounded ribs as 43 and 44 as well as cascaded ridges 42 which serve to increase the heat radiating area of the glass cap 40. In the present instance, such means is in the form of a plurality of punctured openings 69 arranged in concentric circles about the surface of the conductor cap 60 so that hot water vapors created within the interior of the catalyst holder 51 and rising toward the conductor cap 60 may stream out through the openings 69 as rapidly as they are formed. The openings 69 are preferably formed so that the edges thereof have a rough burr to assist in causing the hot and cold gases within the reactor chamber to intermingle and thereby aid in conducting heat away from the cap 60. Because of the arcuate shape of the cap 60, the openings 69A, Fig. 3, adjacent the edge of the conductor cap 60 are at a greater distance from the underside of the glass closure cap 40 than are those openings 69B, Fig. 3, adjacent the center of the conductor cap 60.

One of the essential requirements, as a practical matter, of a catalytic reactor unit of the type presently disclosed, is that the catalyst be maintained in a completely isolated condition in the respect that it must be kept free from the influence of liquids, whether the liquids be in the form of electrolytic solution from the electrolytic cell itself or simply liquid water representing water formed catalytically within the reactor chamber 41 and condensed therein. Thus, as fully described in our aforementioned copending application, the water vapor collected within the reactor chamber 41 condenses in liquid form and runs back into the electrolytic cell through the passageways heretofore described, this of course being the essential function of the reactor unit 20. It is necessary that such condensed water be kept away from the catalyst 55, and partly to this end the holder 51 is lined with waterproof or water-repellent asbestos paper 57 which may also be impregnated with an oxidizing agent for neutralizing stibine as set forth in detail in our copending application.

Under and in accordance with the present invention, return of liquid water back into the interior of the holder 51 is prevented by the shape of the cap 60 and by establishing a diameter for the openings 69 that is small enough to keep the surface tension of the water droplets from "breaking" under the weight of the water droplets, and of course it will be appreciated that the burred or rough edges of the openings 69 is of assistance in this connection. Thus, the rather sharp slope of the rounded cap 60 causes water that is condensed inside the reactor chamber 41 to be shed off the cap 60 quite rapidly. One preferred embodiment is to utilize openings having a diameter of one sixty-fourth of an inch and to arrange these openings concentrically with one-fourth of an inch between.

The water-forming reaction between hydrogen and oxygen is a consuming one in that three volumes of hydrogen and oxygen are required for every two volumes of water vapor formed. Consequently, there will be a mild vacuum within the reactor chamber 41 that tends to "feed" more and more of the reactant gases to the interior of the holder 51 through the slots 51S but at the same time the heat evolved within the holder 51 forces the water vapor out through the openings 69. It will be seen therefore that a mild turbulence will exist within the reactor chamber 41, and the disposition and burring of the openings 69 assists in this mixing so that there is a further heat exchange between the gas molecules themselves which tends to precondition the reactant gases passing into the catalyst holder 51 and which encourages condensation of the water vapors within the reactor chamber 41. Any hydrogen which fails to react on first passage over the catalyst is recirculated and provided with further opportunity to react with oxygen so that the over-all efficiency of the apparatus is further increased.

From the foregoing it will be seen that the present invention is adapted to so combine hydrogen and oxygen catalytically to form water that the catalyst unit is at all times maintained free of the contaminating influence of liquid water, and at the same time the heats of reaction developed within the catalyst unit are rapidly dissipated by the arrangement set forth so that over-heating is prevented. At the same time, however, by resorting to convection, rather than conduction, for transferring heat from the catalyst unit 50 to the glass cap 40, the catalyst unit will operate at a somewhat higher temperature, above 100° C., so that vaporization of the re-combined vapor as well as a somewhat higher temperature for the catalyst material is assured. In this manner, the efficiency of the catalyst is increased, because of the slightly higher temperature, and return of liquid water back to the interior of the catalyst unit 50 is further guarded against.

We claim:

1. A catalytic reactor unit adapted to catalyze the water-forming reaction between oxygen and hydrogen gases evolved from an electrolytic cell comprising, a cap-like housing adapted to be attached to the electrolytic cell in communicating relation with the interior thereof, said housing affording an internal reactor chamber in which said reaction may take place, a passageway in said housing adapted to direct hydrogen and oxygen gases evolved from said cell into said reactor chamber, and a catalyst unit mounted in said reactor chamber including a hollow porous holder having an open end, a mass of finely divided heat insulation material packed into said holder, catalyst material of a type adapted to catalyze the water-forming reaction between hydrogen and oxygen distributed throughout the insulator material whereby the catalyst material is arranged in an insulated relation to neutralize the heats of reaction with the finely divided insulation serving to meter the flow of hydrogen and oxygen uniformly on to the catalyst material, and a one-piece non-corrosive heat-conductive metal cap arranged over said open end of said holder, said cap being provided with a plurality of small openings large enough to direct the water vapors and heats of reaction evolved within said holder out into said reaction chamber where said vapors are condensed and the heats of reaction dissipated by convection, said openings each being small enough to prevent the passage of condensed water from said reaction chamber in a return direction back into the interior of said holder.

2. A catalyst reactor unit adapted to catalyze the water-forming reaction between oxygen and hydrogen gases evolved from an electrolytic cell comprising, a cap-like housing adapted to be attached to the electrolytic cell in communicating relation with the interior thereof, said housing affording an internal reactor chamber in which said reaction may take place, a passageway in said housing adapted to direct hydrogen and oxygen gases evolved from said cell into said reactor chamber, and a catalyst unit mounted in said reactor chamber including a hollow porous holder having an open end, a mass of finely divided heat insulation material packed into said holder, catalyst material of a type adapted to catalyze the water-forming reaction between hydrogen and oxygen uniformly and compactly distributed throughout the insulator material whereby the catalyst material is arranged in an insulated relation to neutralize the heats of reaction with the finely divided insulation serving to meter the flow of hydrogen and oxygen uniformly on to the catalyst material, a heat conductor arranged about the catalyst material to distribute uniformly the heats of reaction throughout said insulation, said heat conducting cap being rounded for shedding liquid water downwardly and outwardly away from the sides of said holder, and said heat conducting cap being provided with a plurality of openings large enough to permit the passage of water vapor formed within said holder therethrough and out into said reactor chamber where the water vapor is condensed and the heats of reaction are dissipated by convection, said openings nevertheless being small enough to prevent the return passage of condensed water back through said cap to the interior of said holder.

3. A catalytic reactor unit adapted to catalyze the water-forming reaction between oxygen and hydrogen gases evolved from an electrolytic cell comprising, a cap-like housing adapted to be attached to the electrolytic cell in communicating relation with the interior thereof, said housing affording an internal reaction chamber in which said reaction may take place, a passageway in said housing adapted to direct hydrogen and oxygen gases evolved from said cell into said reactor chamber, and a catalyst unit mounted in said reactor chamber including a hollow porous holder, a mass of finely divided heat insulation material packed into said holder, catalyst material of a type adapted to catalyze the water-forming reaction between hydrogen and oxygen distributed throughout the insulator material whereby the catalyst material is arranged in an insulated relation to neutralize the heats of reaction with the finely divided insulation serving to meter the flow of hydrogen and oxygen uniformly to the catalyst material, and a cap of heat conducting material arranged over the end of the holder opposite the said one end thereof, said cap being provided with a plurality of openings to permit transfer of heat by convection from the holder to said housing and the passage of water vapor therethrough into said reactor chamber, said openings each having a diameter such as to prevent the passage of condensed water back through said cap to the interior of said holder whereby the catalyst material is maintained dry.

4. A catalytic reactor unit according to claim 3 in which said cap consists of a single piece of metal having a rounded top sloped downwardly from the under side of said housing so as to provide a water shed for diverting condensed water away from said holder.

5. A catalytic reactor unit adapted to catalyze the water-forming reaction between oxygen and hydrogen gases evolved from an electrolytic cell comprising, a cap-like housing including a glass top adapted to be attached to the electrolytic cell in communicating relation with the interior thereof, said glass top affording an internal reactor chamber in which said reaction may take place, a passageway in said housing adapted to direct hydrogen and oxygen gases evolved from said cell into said reactor chamber, and a catalyst unit mounted in said reactor chamber including a hollow porous holder having an open end disposed beneath the underside of said glass top, a mass of finely divided heat insulation material packed into said holder, catalyst material of a type adapted to catalyze the water-forming reaction between hydrogen and oxygen distributed throughout the insulator material whereby the catalyst material is arranged in an insulated relation to neutralize the heats of reaction with the finely divided insulation serving to meter the flow of hydrogen and oxygen uniformly to the catalyst material, and a rounded one-piece metal cap of heat conducting material arranged over the open end of said holder, the top of said cap being sloped downwardly away from the underside of said glass top and provided with a plurality of openings to permit transfer of heat by convection from the catalyst unit to said glass top and the passage of water vapor therethrough into said reactor chamber, said openings each being burred and of sufficiently small diameter to prevent the passage of condensed water back through said cap to the interior of said holder.

6. A catalyst unit for catalyzing the water-forming reaction between hydrogen and oxygen comprising, a hollow porous holder having an open end, a mass of finely divided heat insulating material packed into the interior of said holder, a catalyst of a type for catalyzing the water-forming reaction between hydrogen and oxygen distributed throughout the insulator material whereby the catalyst is heat insulated with the finely divided insulation serving to meter the flow of hydrogen and oxygen uniformly to the catalyst, a sheet of heat conductive and non-corrosive metal arranged about the catalyst within said insulation to distribute uniformly the heats of reaction therethrough, and a one-piece metal cap arranged over the open end of said holder to conduct the heats of reaction away from said holder, said cap having a rounded top that slopes downwardly toward the opposite end of said holder, and said top of the cap being provided with spaced openings to permit transfer of heat by convection from the catalyst unit and the passage therethrough of water vapor from the interior of said holder, said openings being of sufficiently small diameter as to prevent the return of condensed water back to the interior of said holder.

7. A catalyst unit according to claim 6 in which said holder is cone-shaped with the base end thereof being the open end.

8. A catalyst unit for catalyzing the water-forming reaction between hydrogen and oxygen comprising, a hollow porous holder having one end thereof open, a mass of finely divided heat insulating material packed into the interior of said holder, a catalyst of a type for catalyzing the water-forming reaction between hydrogen and oxygen distributed throughout the insulator material whereby the catalyst is heat insulated with the finely divided insulation serving to meter the flow of hydrogen and oxygen uniformly to the catalyst, and a rounded corrosive resistant one-piece metal cap arranged over the open end of said holder, said cap being provided with openings to permit water vapor to pass therethrough from the interior of said holder but each having a diameter sufficiently small to prevent the return of condensed water back into the interior of said holder.

References Cited in the file of this patent

UNITED STATES PATENTS

| Number | Name | Date |
|---|---|---|
| 2,465,202 | Craig | Mar. 22, 1949 |
| 2,615,062 | Craig | Oct. 21, 1952 |

FOREIGN PATENTS

| Number | Country | Date |
|---|---|---|
| 339,824 | Great Britain | Dec. 18, 1930 |